United States Patent [19]

Schwartz et al.

[11] Patent Number: 4,740,161

[45] Date of Patent: Apr. 26, 1988

[54] EDUCATIONAL TOY FOR STIMULATING WRITING

[76] Inventors: Didier Schwartz, 21, rue de Moscou, 75008 Paris; Jean M. Etienne, 4, rue de Fontenay, 94130 Nogent sur Marne, both of France

[21] Appl. No.: 849,456

[22] PCT Filed: Jun. 25, 1985

[86] PCT No.: PCT/FR85/00174

§ 371 Date: Feb. 21, 1986

§ 102(e) Date: Feb. 21, 1986

[87] PCT Pub. No.: WO86/00451

PCT Pub. Date: Jan. 16, 1986

[30] Foreign Application Priority Data

Jun. 28, 1984 [FR] France ................. 84 10214

[51] Int. Cl.⁴ .......................................... G09B 11/00
[52] U.S. Cl. ................................. 434/162; 434/169; 434/85
[58] Field of Search ............... 434/162, 163, 164, 169, 434/408, 85-88

[56] References Cited

U.S. PATENT DOCUMENTS

| 3,673,708 | 7/1972 | Beuens | 434/164 |
| 3,690,020 | 9/1972 | McBratnie | 434/163 |
| 4,111,052 | 9/1978 | Sniderman | 73/432 R |
| 4,633,436 | 12/1986 | Flurry | 434/162 |

FOREIGN PATENT DOCUMENTS 2248322  4/1974  Fed. Rep. of Germany ...... 434/162

*Primary Examiner*—Leo P. Picard
*Attorney, Agent, or Firm*—Schwartz, Jeffery, Schwaab, Mack, Blumenthal & Evans

[57] ABSTRACT

A sound and/or visually stimulating stylus for encouraging learning to write. In accordance with the invention, the stylus (1) includes a moving equipment (2) and a sound source (4, 4a) modulated by a transducer which is sensitive to deformations of the moving equipment. The stylus is applicable to teaching.

21 Claims, 3 Drawing Sheets

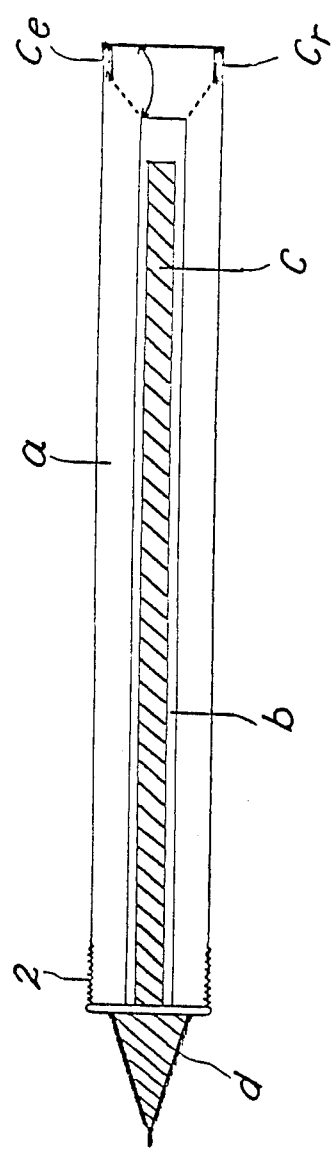
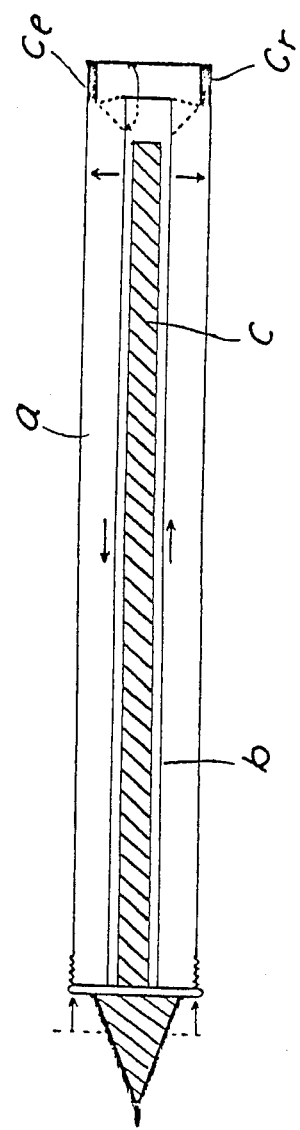
FIG. 2 I
FIG. 2 II

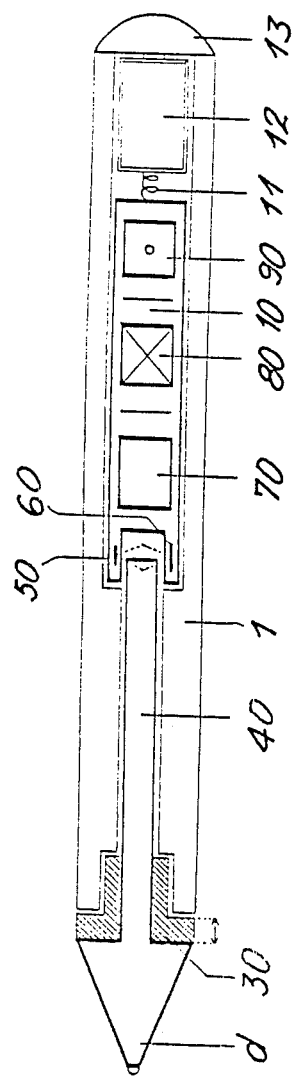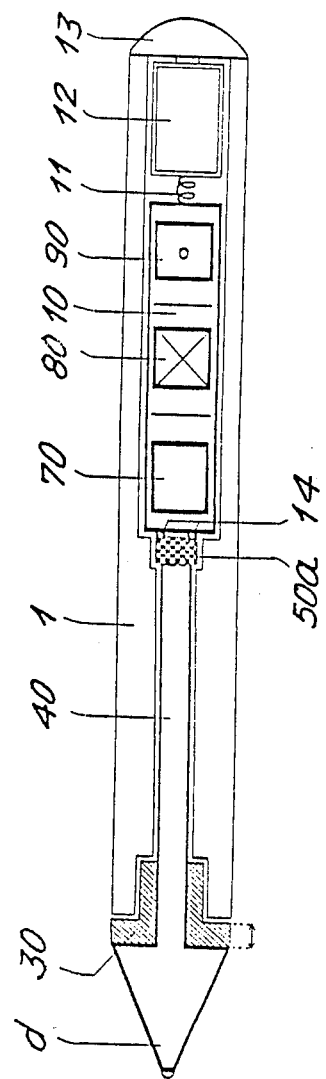

EDUCATIONAL TOY FOR STIMULATING WRITING

TECHNICAL FIELD

The invention seeks to provide an educational toy intended to stimulate writing and drawing by providing an immediate sound and visual result while marking ordinary paper.

It makes it possible to establish a playful contact which is stimulating and encouraging between the child and the tool on which writing is based: a pen-pencil.

The invention is motivated by the fact that keyboards for computers and other machines for writing and drawing are giving rise, by virtue of their evermore sophisticated and playful aspects to a worrying lack of interest in the basic pen-pencil tool.

The invention is mainly intended:

(1) for a child's first approaches to drawing and learning to write; and (2) to reeducating a child who for some physical or psychological reason is suffering from difficulty in writing and drawing.

PRIOR ART

Systems are known which are intended for uses very different from those of the invention (checking signatures) which make use of a stylus or the like provided with means sensitive to the pressure exerted on the tip during writing.

However, none of these prior art items discloses nor suggests exploiting the signals generated by pressure variations, or more generally by movements, of the point to create a sound and/or visual phenomenon, which is immediately exploited to stimulate the user, for example a child learning to write.

DESCRIPTION OF THE INVENTION

To this end, the invention thus provides an educational toy for stimulating writing, in particular by a child, the toy being characterized in that it comprises a stylus whose point is fixed to a moving equipment sensitive to writing pressure, and in that a transducer is coupled to said moving equipment and in that said transducer constitutes a part of modulator means for modulating a sound source and/or visual display means.

The invention is stimulating since the pen-pencil object produces sound and/or visual attraction as soon as it is used.

It is encouraging for the child performing writing or drawing since from the moment the first line is traced it generates an immediate result which suggests to the child that writing and drawing have an external effect thereby making the child aware of the communication function of written language.

The invention appears more clearly from the following description of several embodiments in accordance with its principle, given purely by way of example and with reference to the accompanying drawings, in which:

FIG. 1 is a diagrammatic view of an educational toy in accordance with the invention;

FIGS. 2-I and 2-II show a stylus in accordance with the invention shown in longitudinal section and illustrating how it operates;

FIG. 3 shows another embodiment of the stylus; and

FIG. 4 shows yet another embodiment of the stylus.

Figure 1:
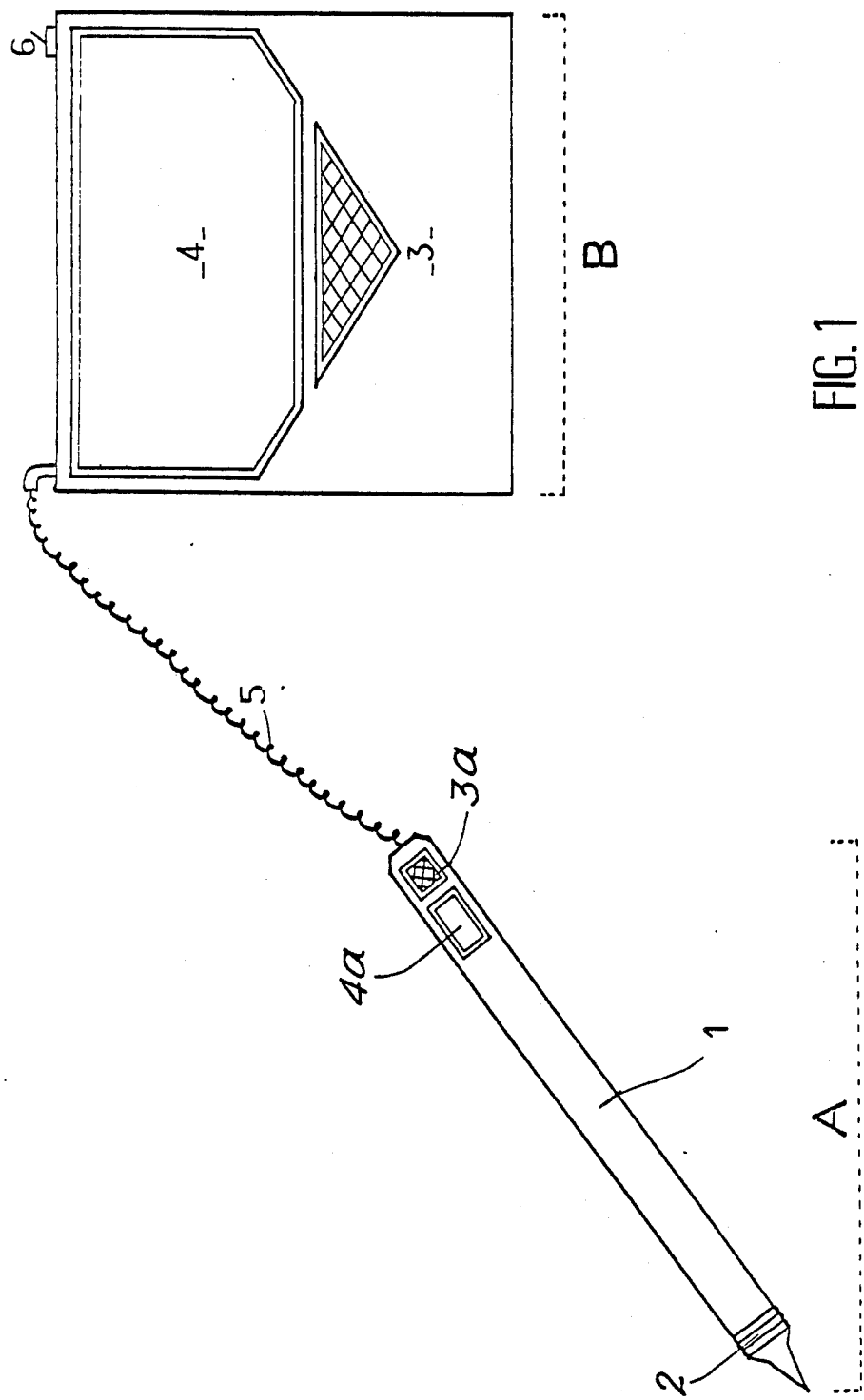

With reference to FIG. 1, a stylus (1) comprises a moving equipment (2) sensitive to writing pressure and connected to an internal device (FIG. 2) including a transducer which converts pressure differences into a signal which is subsequently transformed into sound emission (melodic or otherwise) emitted by an incorporated sound emitter (3a) or by a sound emitter outside the stylus (3) in conjunction with (or not) a moving visual representation which may be incorporated (4a) in particular using liquid crystals, or else independent of the stylus (4).

When the sound and/or visual representation is outside the stylus:

a wire (5) or any other suitable wireless arrangement (e.g., infrared) may be used to transmit said representation from block A to block B, and for the pedagogical function of the item, it may be advantageous to incorporate disabling means controlled by a switch (6) for turning off emission of the sound signal and/or for freezing the visual representation if the child is not using the stylus in the way the educator is asking.

The device for converting pressure differences exerted on the stylus into a sound and visual signal may, for example, be of the type shown in FIG. 2, given that any equivalent technical means for performing this transmission forms an integral part of the application, which means may be piezo-electric or otherwise.

FIG. 2-I shows a stylus comprising two cylindrical tubes, with the first (a) or outer tube serving as the stylus body and including a deformable portion (2) for transmitting pressure variations, and with the second (b) or internal tube of smaller diameter including an ink cartridge (c) slidably mounted inside the first (a) tube. The inner tube also includes the point (d) of said stylus. A device comprising a light-emitting source (Ce) and a photosensitive receiver (Cr) is placed at the top of the stylus close to the end of the inner tube (b) or of an item fixed thereto. The photosensitive arrangement may be replaced by a piezo-electric device fixed to the outer tube (a) and coupled to the inner tube (b), or vice versa.

FIG. 2-II shows the stylus while tracing a line: the tube (a) is subjected to pressure and transmits vertical and lateral translation motion to the tube (b), which motion is interpreted by the cells as a variation in the angle or the cross-section of the beam emitted by (Ce) and received by (Cr). This variation modulates the sound and visual signals.

In the example shown in FIG. 3, while a line is being traced, the pressures exerted on the writing point (d) are transmitted by means of an elastically compressible sleeve (30) and cause longitudinal movements of a rigid cartridge 40 fixed to the writing point (d).

These longitudinal movements of the rigid cartridge partially mask an infrared beam emitted by a pulsed infrared emitter (50) towards an infrared receiver (60), thereby varying the received radiation. These variations are converted into electrical signals by the receiver (60) and processed by a voltage-to-frequency converter (70). The resulting frequency variations are amplified by amplifier (80) and are made audible by means of a sound transducer (piezo-electric) (90). The assembly (50), (60), (70), (80), (90) is assembled on a circuit (10) which is held in place inside the body (1) by a spring (11) and which is powered by a battery (12). At its top end, the body (1) is closed by a rotary stopper (13) serving as a switch.

In the FIG. 4 example, during longitudinal displacements of the rigid cartridge (40) a block of variable resistance synthetic foam (50a) is compressed, thereby causing variations in resistance between two contact points (14) fixed to the circuit (10). These variations in resistance are procesed by a voltage-to-frequency converter (70) amplified by an amplifier (80) and made audible by means of a sound transducer (90).

What is claimed is:

1. An educational toy for stimulating writing, in particular for children, comprising a stylus having a writing point fixed to a moving equipment sensitive to writing pressure, a transducer coupled to said moving equipment, and stimulating signal emitting means coupled to the said transducer for emitting a stimulating signal modulated by the writing pressure.

2. An educational toy according to claim 1, characterized in that said stylus comprises an outer tube comprising a body and separated from the point which is fixed to an inner tube by means of a deformable portion, said inner tube by means of a deformable portion, said inner tube having an ink cartridge or the like therein and moveable inside said outer tube in response to deformations of said deformable portion, said transducer being arranged in said outer tube and being sensitive to movements of said inner tube.

3. An educational toy according to claim 2, characterized in that said transducer comprises a light source and a photoelectrical receiver (Cr) facing said source, and in that an end of said inner tube (b) or of an item fixed thereto is movable in a vicinity of the space between said light source and said receiver.

4. An educational toy according to claim 2, characterized in that said transducer comprises a piezo-electric device fixed to one of said tube and coupled to said other tube.

5. An educational toy according to claim 2, characterized in that said transducer comprise an infrared emitter (50) placed opposite an infrared receiver (60), and in that an end of said inner tube (40) or of an item is movable in the vicinity of a gap between said emitter and said receiver.

6. An educational toy according to claim 2, characterized in that said inner tube having the point is mounted in said outer tube with a sleeve (30) of resilient material interposed therebetween.

7. An educational toy according to claim 2 characterized in that said inner tube is connected to a block of synthetic foam (50a) of variable resistance, said block constituting said transducer.

8. An educational toy according to claim 1 characterized in that said stylus includes an incorporated sound emitter.

9. An educational toy according to claim 8, characterized in that said stylus comprises a voltage-to-frequency converter (70) connected to said transducer.

10. An educational toy according to claim 9, characterized in that said converter is connected to a sound transducer (90).

11. An educational toy according to claim 10 wherein said sound transducer is of the piezo-electric type.

12. An educational toy according to claim 1 characterized in that said stylus is connected by wires to a separate unit including a sound source (3).

13. An educational toy according to claim 1 further comprising controllable disabling means.

14. An educational toy according to claim 1 characterized in that said stylus includes an incorporated display means.

15. An educational toy according to claim 14 wherein said display means includes liquid crystals.

16. An educational toy according to claim 1 characterized in that said stylus is connected by wires to a separate unit including a visual representation means.

17. A method for teaching writing skills comprising the steps of:
   (a) monitoring pressures applied by a writer to a stylus by monitoring movement of said stylus relative to a fixed transducer;
   (b) converting said pressures to an electrical signal; and,
   (c) converting said electrical signal into a form for stimulating the writer.

18. A method for teaching writing skills as recited in claim 17 further comprising the steps of:
   (a) transmitting vertical and lateral pressure form an outer tube of said stylus to an inner tube of said stylus; and,
   (b) detecting relative motion of said inner tube between a photosensitive emitter and a photosensitive receiver.

19. A method for teaching writing skills as recited in claim 17, further comprising the steps of:
   (a) transmitting vertical and lateral pressure from an outer tube of said stylus to an inner tube of said stylus; and,
   (b) detecting relative motion between said tubes using a piezo-electric device conected to one of said tubes and coupled to the other of said tubes.

20. A method for teaching writing skills as recited in claim 17 wherein the form for stimulating the writer comprises a sound transducer modulated by said electrical signal.

21. A method for teaching writing skills as recited in claim 17 wherein the form for stimulating the writer comprises a visual display means modulated by said electrical signal.

* * * * *